Aug. 23, 1932.        R. G. GRISWOLD        1,873,119
AIR COOLED VALVE AND VALVE SEAT
Filed July 20, 1927

Inventor
ROBERT G. GRISWOLD
By His Attorney
Edmund G. Borden

Patented Aug. 23, 1932                                                    1,873,119

UNITED STATES PATENT OFFICE

ROBERT G. GRISWOLD, OF WESTFIELD, NEW JERSEY, ASSIGNOR TO DOHERTY RESEARCH COMPANY, OF NEW YORK, N. Y., A CORPORATION OF DELAWARE

AIR COOLED VALVE AND VALVE SEAT

Application filed July 20, 1927. Serial No. 207,092.

The present invention relates to an engine, to a high temperature valve therefor, and to a method of operating the same.

It is well known that valves used for controlling high temperature gases are subjected to serious erosion. For instance, the exhaust valves of Diesel engines give difficulty on account of the corrosion and consequent erosion of their contact surfaces by the hot gases from the engine cylinders. The difficulties due to erosion by hot gases are intensified when the valves are used as transfer valves in compound internal combustion engines and particularly when the valves are used to control the gases flowing out of simple or compound engine cylinders having heat insulating linings.

The primary object of the present invention is to provide means for protecting against corrosion the contact or seating surfaces of valves used for controlling high temperature gases.

A second object of the present invention is to provide means for protecting the working surfaces of high temperature valves by a surface layer of relatively cool gas.

Another object of the present invention is to provide a simple easily constructed fluid cooled valve and valve seat.

The novel features of the present invention are pointed out with particularity in the appended claims. The invention itself however, together with further objects and advantages, will best be understood from the following description taken in connection with the accompanying drawing in which Fig. 1 is a view partly in elevation and partly in vertical section of a compound internal combustion engine having a transfer valve according to the present invention;

Figure 1:
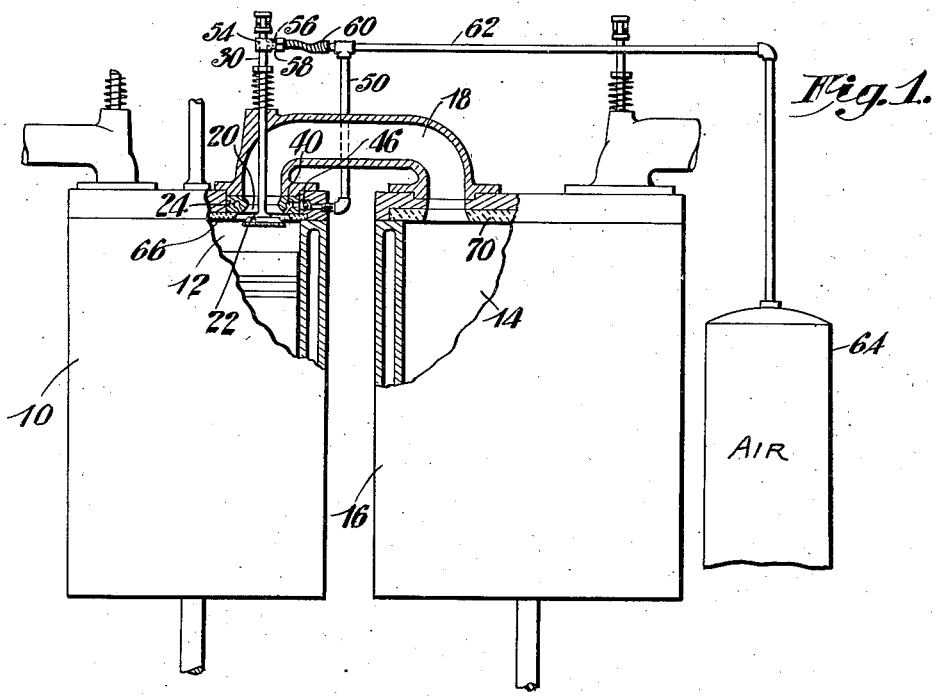
Figure 2:
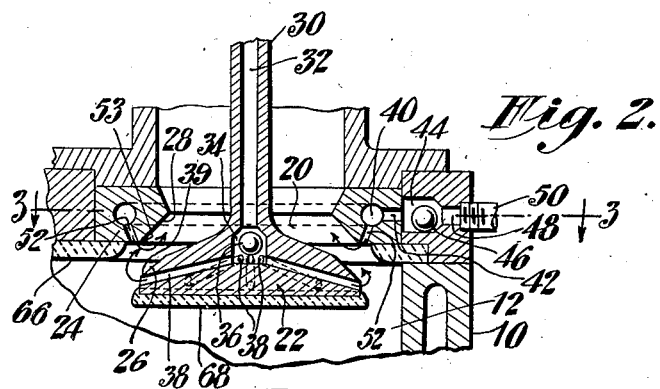
Fig. 2 is a sectional view on an enlarged scale of a transfer valve appearing in Fig. 1.
Figure 3:
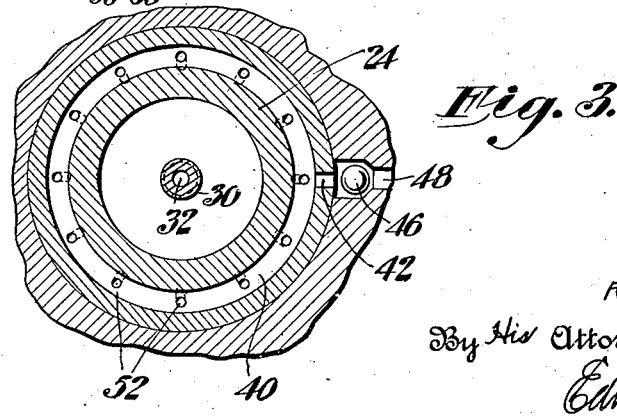
Fig. 3 is a section on a line 3—3, Fig. 2.

In the embodiment of the present invention illustrated in the drawing, 10 is the high pressure cylinder of a compound internal combustion engine having a combustion space 12. The combustion space 12 of cylinder 10 is connected with the expansion space 14 of the low pressure cylinder 16 by means of a transfer port or passage 18. At given intervals, gases from the combustion and expansion space of chamber 12 pass through the valve ports 20 into the passage 18 and into the cylinder 14. The flow of gases through the port 20 is controlled by the transfer valve 22 in cooperation with a valve seat 24 surrounding the port 20. The valve 22 has a contact or seating surface 26 which seats against a complemental or co-operating contact surface 28 on the seat 24. When the valve 22 opens, highly heated gases begin to pass between the surfaces 26 and 28. Ordinarily, these gases are accelerated by a considerable difference of pressure between chamber 12 and passage 18 so that they have a high velocity as well as high temperature. These conditions are favorable to a high rate of erosion of the surfaces 26 and 28. In order to reduce the erosion of the valve and seat, according to the present invention, a cooling fluid is introduced into the gases leaving the chamber 12, at points such that the flow of outgoing gases will sweep the cooling fluid along the surfaces 26 and 28 forming a protective layer or film of relatively cool gas or vapor along surfaces 26 and 28 and thereby protecting these surfaces from corrosion by the highly heated gases and subsequent erosion thereby. For the purpose of introducing protective cooling fluid, the stem 30 of the valve 22 is made hollow thereby providing a central conduit 32 running through the stem 30. Near the point where the stem 30 connects with the valve 22, a valve chamber 34 is formed in the valve 22, chamber 34 connecting with the conduit 32. A ball valve 36 is placed in the chamber 34 and the upper end of the chamber is formed to provide a seat whereby the valve 36 acts to prevent flow in the direction from chamber 34 back into the conduit 32. Running from the lower portion of the chamber 34 to the outer edge of valve 22 are a plurality of passages 38, 38 whereby fluid may be delivered from the chamber 34, the lower end of chamber 34 being so formed that the ball valve 36 cannot close the inner ends of passages 38. Fluid passing outwardly through passages 38 is discharged, when the valve 22 is open, into the stream of hot gases passing out through port 20. Moreover, the outer ends of the passages 38 are arranged adjacent the forward edge 39 of the contact surface 26 of valve 22. Fluid discharged from passages 38 is therefore in the best position to spread along the contact surface 26 and to form a protecting envelope, layer or film of relatively cool gas over said contact surface, the passages 38 being close enough together to cause an envelope of cool gas to form. The fluid from the passages 38 is assisted in spreading along the surface 26 by the outflowing hot gases which pass from the forward edge of the surface 26 toward the rearward edge thereof. The fluid discharged through the conduit 32 and the passages 38 being relatively cool as compared with the gases discharged from chamber 12 through the port 20, said fluid not only acts to protect the contact surface 26 from the hot gases, but also cools the valve 22 and stem 30 interiorly. The cooling fluid passed through duct 32 and passages 38 may be air or other gas such as nitrogen or carbon dioxide or it may be steam or water. The valve 22 being a transfer valve in the arrangement illustrated in the drawing, the cooling fluid discharged through it into the outgoing stream of hot gases not only cools the valve and forms a protecting film or layer along the contact surface thereof, but expands in the chamber 14 thereby developing power in the low pressure cylinder 16 due to its pressure and the heat absorbed from the hot gases of combustion and acting as a thermodynamic medium as well as a cooling medium. It will be understood that if water is used as cooling medium in the valve 22 it is supplied only in such quantities that it is converted into steam either before or at the instant of its discharge from the passages 38 into the outgoing stream of hot combustion gases, so that it forms a protective layer of gas over the valve and seat similarly to air or nitrogen.

The valve seat 24 also is preferably constructed and arranged so that a protective layer or film of relatively cool gas is formed along its contact surface 28 during the period that hot gases are being discharged through the port 20. For this purpose, the valve seat 24 is provided with an annular chamber 40. In the arrangement as illustrated, cooling fluid is introduced into the chamber 40 through a port 42 leading from valve chamber 44 in which is a check valve 46. Valve 46 prevents backflow of the fluid from chamber 40 through the valve chamber 44. An inlet port 48 conducts cooling fluid from the supply pipe 50 to the valve chamber 44. Cooling fluid having entered chamber 40 from pipe 50 is discharged into the gases flowing to port 20 through passages 52, 52 at a point adjacent the forward edge 53 of the contact surface 28 of valve seat 24. The discharge ends of the passages 52, moreover, are so arranged that fluid leaving said passages enters the stream of gases passing out through the port 20 at points such that the cooling fluid is carried along by the outgoing gases from the forward edge of surface 28 over the entire face of this surface thereby forming a protecting envelope, film or layer of relatively cool gas. Passages 52 are set close enough together to cause an envelope of cool gas to form. The working or contact surface of the valve seat 24 is thereby protected against erosion in the same manner as the contact surface 26 of valve 22.

The supply of cooling fluid for the valve 22 and seat 24 may come conveniently from the same source. In the arrangement illustrated in the drawing, the upper or outer end of the valve stem 30 carries a collar 54 having passage 56 connecting with the conduit 32 in the valve stem 30, collar 54 having a nipple 58 thereon through which the passage 56 passes. The nipple 58 is connected to a flexible tube 60, through which cooling fluid is introduced in the collar 54 and valve stem 30 from a pipe 62. The pipe 50 also is preferably brought around to connect with the pipe 62, pipe 62 being connected to a tank 64 containing a supply of cooling fluid under pressure for use in protecting valve 22 and seat 24 as previously described. The fluid in tank 64 is preferably under a pressure in excess of that in chamber 12 at the end of the working stroke of the piston in cylinder 10 when the engine is operating under normal full load.

The present invention permits the outlet valve of a cylinder such as 10 to control gases having high temperatures. The loss of heat from the chamber 12 may therefore be prevented in whole or in part without danger of overheating the outlet valve. I have accordingly illustrated cylinders 10 as having a heat-insulating lining 66 on the inner face of its cylinder head. Moreover, if desired, the piston and the curved portions of the cylinder 10 may have heat-insulating linings or coverings.

It is preferred moreover that the surface of valve 22 which is exposed to the combustion chamber 12 have a heat insulating covering 68 thereon, also the head of low pressure cylinder 16 preferably has an insulating lining 70 and may have insulating linings or coverings on other parts if desired.

While I have illustrated and described in detail a particular embodiment of the present invention it will be understood that the apparatus herein disclosed is illustrative only of the invention and that I do not limit myself thereto, the intention being to claim the invention as broadly as the state of the art permits.

Having thus described my invention, I claim:

1. The combination of a valve, a seat for said valve, said valve having a contact surface beveled inwardly in the direction of flow through the valve port, and means for introducing a fluid envelope to the fluid passing through the valve port and at a point adjacent the front edge of the contact surface of the valve.

2. The combination of a valve, a seat for said valve, said valve having a contact surface beveled inwardly in the direction of flow through the valve port, means for introducing a fluid envelope to the fluid passing through the valve port and at a point adjacent the front edge of the contact surface of the valve, and means for introducing a fluid envelope to the fluid passing through the valve and at a point adjacent the front edge of the contact surface of the valve seat.

3. The combination of a valve having a contact surface beveled inwardly in the direction of flow of gases through the valve port, said valve having internal passages, said passages being so placed as to open adjacent the outer edge of the valve, and means for running cooling fluid through said passages and discharging substantially in front of the outer edge of said contact surface.

4. The combination of a valve, said valve having passages therein opening near the outer edge of the valve, a seat for said valve, said seat having passages opening near the forward end of the contact surface of the seat, and means for passing cooling fluid through said passages and discharging it both near the outer edge of said valve and near the forward edge of the contact surface of said seat.

5. The combination of a valve having passages therein, means for passing cooling fluid through said passages, said passages opening into a space the outlet of which is controlled by said valve, means for passing fluid through said passages into said space, and a check valve for preventing backflow of fluid from said space through said valve.

6. The combination of a valve, a seat for said valve, said valve and seat having passages therethrough, means for passing cooling fluid through said passages in said valve and seat and discharging it from said passages, and check valves for preventing backflow of fluids through said valve and seat.

7. In an apparatus of the kind described, a port and a valve therefor having passages therethrough and opening upon fluid passing through the valve port, at a point next to but in advance of the outer edge of said surface, and means for passing cooling fluid through said passages and discharging it therefrom.

8. In an apparatus of the class described, a port and a valve seat therein having passages therethrough and opening upon fluid passing through the valve port, means for passing cooling fluid through said passages and discharging it therefrom, and a check valve for preventing backflow of fluid through said passages.

9. The combination of a valve seat, said seat having passages therein opening near the forward end of the contact surface of the seat, and means for passing cooling fluid through said passages and discharging it therefrom.

10. In apparatus of the kind described, a valve, a seat for said valve, said valve and seat having passages therethrough and opening upon fluid passing through the valve port, and means for passing cooling fluid through said passages and discharging it therefrom.

11. In an apparatus of the class described, a port and a valve therefor having passages therethrough and opening upon fluid passing through the valve port, means for passing cooling fluid through said passages and discharging it therefrom, and a check valve for preventing back flow of fluid through said passages.

12. The combination of a compound internal combustion engine comprising means for the multistage expansion of gases, a port and a valve for controlling the flow of gases from one of said expansion stages to another, a seat for said valve in said port, means for passing cooling expansible fluid through said valve and valve seat and upon the gases passing through the port of said valve at points ahead of the contact faces of said valve and valve seat.

13. The combination of a compound internal combustion engine comprising means for the multistage expansion of gases, a port and a valve, a seat in said port through which the gases flow in passing from one of said expansion stages to another, and means for passing cooling expansible fluid through said seat and upon the gases passing through the port of said seat at a point ahead of the contact face of said seat.

In testimony whereof I affix my signature.

ROBERT G. GRISWOLD.